May 17, 1949.  A. JACOBSEN  2,470,621
FISHING NET
Filed March 2, 1945  2 Sheets-Sheet 1
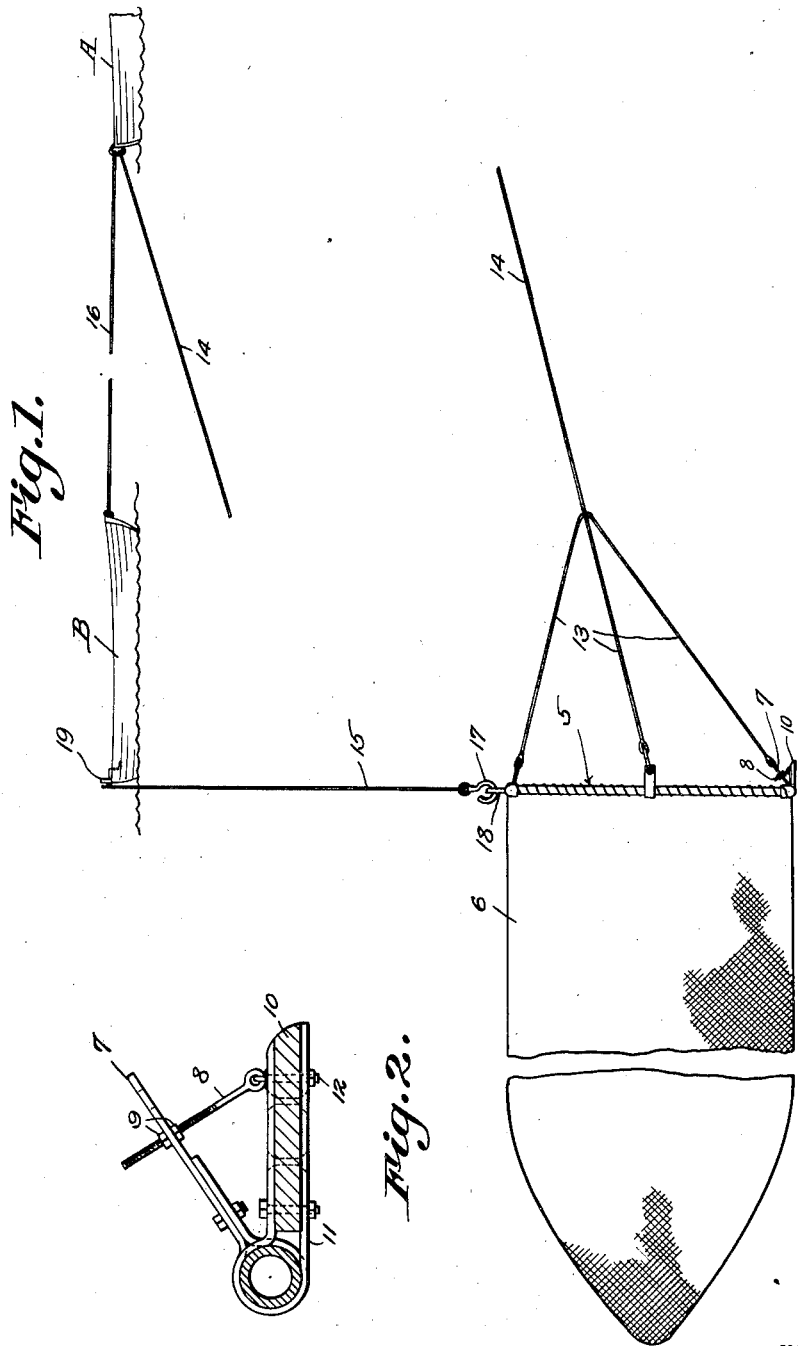
INVENTOR.
Arne Jacobsen
BY
ATTORNEYS.

May 17, 1949. A. JACOBSEN 2,470,621
FISHING NET
Filed March 2, 1945 2 Sheets-Sheet 2
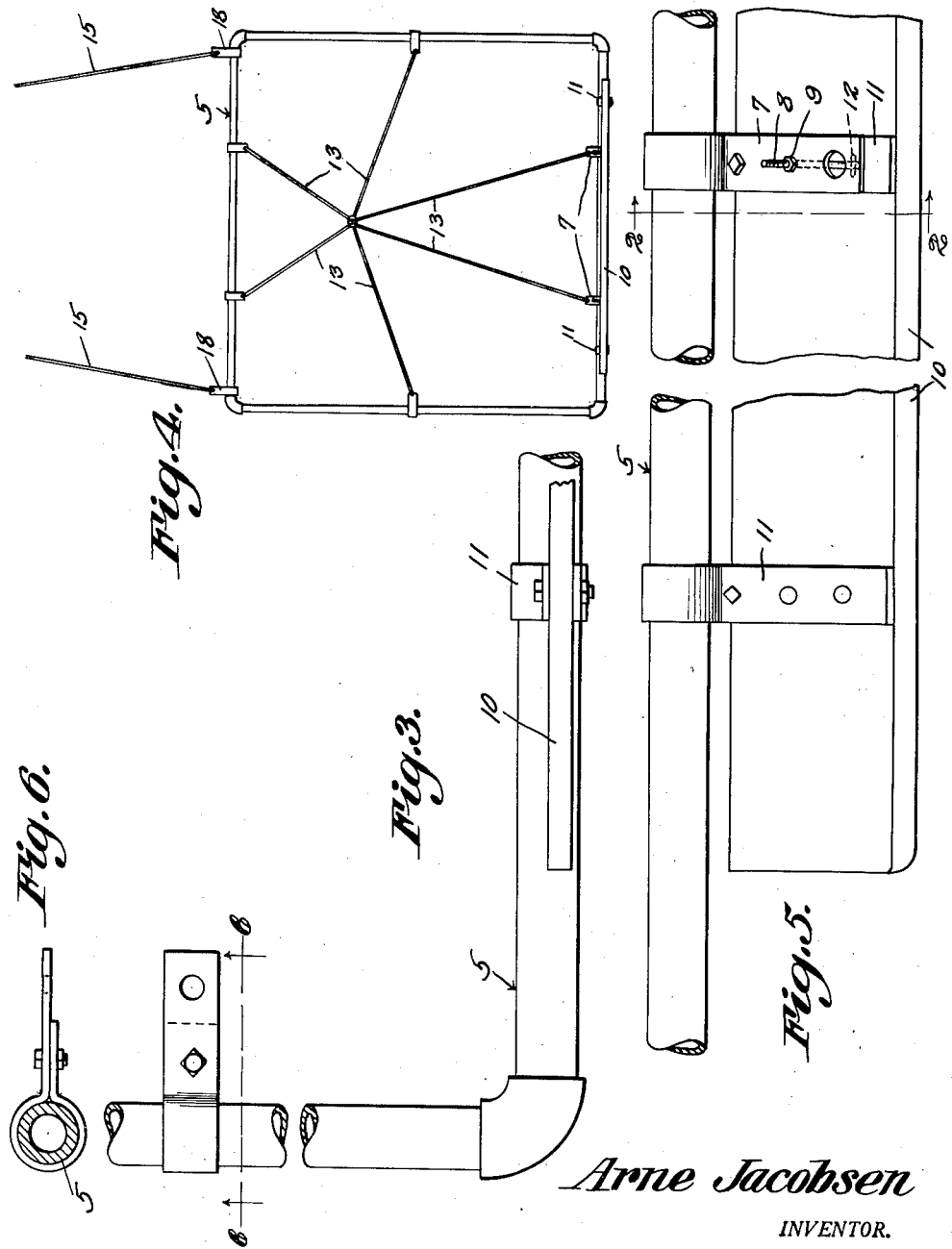
Arne Jacobsen
INVENTOR.
BY
ATTORNEYS.

Patented May 17, 1949

2,470,621

UNITED STATES PATENT OFFICE 2,470,621

FISHING NET

Arne Jacobsen, Accord, N. Y.

Application March 2, 1945, Serial No. 580,530

1 Claim. (Cl. 43—7)

This invention relates to fishing nets, and more particularly to fishing nets used for trolling in deep water in catching herring, sardines and other small fish.

The primary object of the invention is to provide a fishing net of this character having means for regulating and controlling the net at the desired depth, while trolling, thereby eliminating the necessity of adjusting the net for depth, each time the net is emptied and returned to the water.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is an elevational view, illustrating a net constructed in accordance with the invention.

Figure 2 is a sectional view taken on line 2—2 of Fig. 5.

Figure 3 is a fragmentary enlarged elevational view illustrating one corner of the net frame.

Figure 4 is a front elevational view of the net frame.

Figure 5 is a fragmental plan view illustrating the means for securing the depth fin.

Figure 6 is a sectional view taken on line 6—6 of Fig. 3.

Referring to the drawings in detail, the mouth of the net is indicated by the reference character 5 and embodies a rigid rectangular frame constructed preferably of tubular sections.

The reference character 6 indicates the net which may be of any desired construction, the open end of the net being secured to the rectangular frame forming the mouth of the net.

Secured to the lowermost tubular section of the rectangular frame or net mouth, are forwardly and upwardly inclined arms 7 which are formed with openings through which the adjusting eye bolts 8, extend, the eye bolts being provided with securing nuts 9 so that the bolts may be adjusted through the openings.

The reference character 10 designates the depth fin which is secured to the lowermost tubular section of the rectangular frame, by means of the strap hinges 11. The eye bolt 8 is connected with the depth fin through the eye bolts 12 which are shown as extended through the depth fin. This depth fin is designed to operate to cause the lower front edge of the mouth of the net to either ascend or descend within the body of water through which the net is being towed, which action is caused by the angular position of the depth fin, with respect to the net frame.

Secured to the rectangular frame or mouth of the net, are the harness cables 13, to which the draft cable 14 is connected, the draft cable 14 being also connected with the stern of the towing vessel which in the present showing, is indicated by the reference character A.

In trolling for herring or sardines depth fin 10 is adjusted to the desired angular position to cause the forward end of the frame to ascend or descend as may be desired, to hold the frame at the desired depth. The net is now lowered to the desired depth, by means of the cable 15 that operates over the winch 19 mounted in the stern of the vessel B which is towed by the power vessel A through the tow cable 16. A hook indicated at 17 is provided on the end of the cable 15, and is designed to hook into the eyes 18, extending upwardly from the mouth or rectangular frame forming a part of the net, the normal lengths of cables 14 and 16 may be lengthened or shortened as desired.

From the foregoing it will be seen that due to the construction shown and described, the depth fin may be regulated for depth, to the end that as the net is being drawn through the body of water, the net will be retained at a predetermined level. This is important in trolling, since if the net is too low, it will rest at a point below the school of fish to be caught. If the net is too high, the school of fish may pass thereunder.

Adjustment of the level of operation of the net is also desirable, since undercurrents and waves in rough weather, tend to move the net to a position either too high or too low for the best results.

What I claim is:

In a trolling net, a net portion, a rectangular rigid frame secured to the open end of the net, providing the mouth of the net, a wide fin pivotally connected with the lower side of the rectangular frame, arms secured to the lower side of the frame, said arms having openings, adjusting bolts secured to the fin and being extended through said openings, and nuts on the adjusting bolts and adapted to regulate the angle of operation of the fin, thereby controlling the depth of operation of the net.

ARNE JACOBSEN.

REFERENCES CITED

The following references are of record in the file of this patent:

UNITED STATES PATENTS

| Number | Name | Date |
|---|---|---|
| 155,140 | Brewster | Sept. 22, 1874 |
| 1,061,082 | Kahrs | May 6, 1913 |
| 1,220,921 | Wilson | Mar. 27, 1917 |
| 1,959,793 | Lafredo et al. | May 22, 1923 |